US012214773B2

United States Patent
Kusaka

(10) Patent No.: US 12,214,773 B2
(45) Date of Patent: Feb. 4, 2025

(54) VEHICLE CONTROL DEVICE

(71) Applicant: TOYOTA JIDOSHA KABUSHIKI KAISHA, Toyota Aichi-ken (JP)

(72) Inventor: Hiroto Kusaka, Susono Sizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 18/076,913

(22) Filed: Dec. 7, 2022

(65) Prior Publication Data

US 2023/0192066 A1 Jun. 22, 2023

(30) Foreign Application Priority Data

Dec. 21, 2021 (JP) ................................. 2021-207077

(51) Int. Cl.
*B60W 20/20* (2016.01)
*B60L 50/50* (2019.01)
(Continued)

(52) U.S. Cl.
CPC ............ *B60W 20/20* (2013.01); *B60W 10/06* (2013.01); *B60W 10/08* (2013.01); *B60W 20/40* (2013.01);
(Continued)

(58) Field of Classification Search
CPC ...... B60W 20/40; B60W 10/08; B60W 20/20; B60W 30/182; B60W 10/06;
(Continued)

(56) References Cited

U.S. PATENT DOCUMENTS 11,472,399 B2 * 10/2022 Omuro .................... B60K 6/383
11,572,057 B2 * 2/2023 Tabata .................... F02B 37/12
(Continued)

FOREIGN PATENT DOCUMENTS

CN 103648832 B * 7/2015 .............. B60L 15/20
CN 108501944 A * 9/2018 ............ B60W 30/02
(Continued)

OTHER PUBLICATIONS

Sarvestani, Ahad Soltani, and Ali Akbar Safavi. "A novel optimal energy management strategy based on fuzzy logic for a hybrid electric vehicle." 2009 IEEE International Conference on Vehicular Electronics and Safety (ICVES). IEEE,. (Year: 2009).*
(Continued)

*Primary Examiner* — Cuong H Nguyen
(74) *Attorney, Agent, or Firm* — Dinsmore & Shohl LLP

(57) ABSTRACT

A vehicle control device for a vehicle includes an engine; and a power converter, so that the vehicle travels by selectively executing one of a first traveling mode, a second traveling mode, and a third traveling mode in which the vehicle travels by a torque of both the engine and the rotation electric machine. Further, in a case where an air pressure around the vehicle and a system voltage are in a predetermined area of a preset map indicating a relationship between the air pressure and the system voltage, the vehicle control device is configured to reduce a switching speed of a switching element of the power converter to be lower than a normal speed, and cause the engine to operate, limit a torque of the rotation electric machine, and execute the third traveling mode.

4 Claims, 3 Drawing Sheets

(51) Int. Cl.
| | | |
|---|---|---|
| *B60W 10/06* | (2006.01) | |
| *B60W 10/08* | (2006.01) | |
| *B60W 20/40* | (2016.01) | |
| *B60W 30/182* | (2020.01) | |
| *B60L 15/20* | (2006.01) | |
| *B60L 50/16* | (2019.01) | |

(52) U.S. Cl.
CPC ............ *B60W 30/182* (2013.01); *B60L 15/20* (2013.01); *B60L 50/16* (2019.02); *B60W 2556/00* (2020.02); *B60W 2710/083* (2013.01)

(58) Field of Classification Search
CPC ....... B60W 2710/083; B60W 2556/00; B60W 2510/244; B60W 2540/10; B60W 2555/20; B60W 20/00; B60K 6/445; Y02T 10/62; B60L 50/16; B60L 50/50; B60L 50/60; B60L 15/20; F04N 11/0848; F04N 11/0851
USPC .......................................................... 701/22
See application file for complete search history.

(56) References Cited

U.S. PATENT DOCUMENTS

| | | | |
|---|---|---|---|
| 2011/0004364 A1* | 1/2011 | Sawada | B60K 6/445 903/930 |
| 2015/0167615 A1 | 6/2015 | Komuro et al. | |
| 2017/0021733 A1 | 1/2017 | Kondou et al. | |
| 2021/0053552 A1* | 2/2021 | Szczepaniak | B60W 10/18 |
| 2021/0086752 A1* | 3/2021 | Tabata | B60K 6/24 |

FOREIGN PATENT DOCUMENTS

| | | | | |
|---|---|---|---|---|
| CN | 108715163 A | * | 10/2018 | ............ B60W 10/06 |
| CN | 109915298 A | * | 6/2019 | |
| CN | 113525340 A | * | 10/2021 | ............... B60K 6/26 |
| JP | 3966702 B2 | * | 8/2007 | ............. B60L 50/61 |
| JP | 2013023185 A | * | 2/2013 | |
| JP | 2014-028586 A | | 2/2014 | |
| JP | 2014-155349 A | | 8/2014 | |
| JP | 2017028900 A | * | 2/2017 | ............. B60L 11/08 |
| JP | 2018-046714 A | | 3/2018 | |
| JP | 2019062596 A | * | 4/2019 | |
| KR | 20230082472 A | * | 6/2023 | ............. B60L 15/20 |

OTHER PUBLICATIONS

Krithika, V., and C. Subramani. "A comprehensive review on choice of hybrid vehicles and power converters, control strategies for hybrid electric vehicles." International journal of energy research 42.5 (2018): 1789-1812. (Year: 2018).*
JP-2017028900-A by Kondo Y et al (NPL English-translated Version) (Year: 2017).*
A translated version of JP2013023185A by Kazuhito Hayashi et al., "Hybrid vehicle and control method for the same" (Year: 2013).*
An English-translated version of KR 20230082472 A by Zu et al. (published Jun. 8, 2023) (Year: 2023).*
Alizadeh, Maryam, Sumedh Dhale, and Ali Emadi. "A Critical Review and Future Prospects of Control-Oriented HVAC Modelling Strategies in Electric Vehicles." IEEE Transactions on Transportation Electrification (2023). (Year: 2023).*
Ryde, Alexander. "Development and testing of a high-country electric vehicle." (2022). (Year: 2022).*
Cheng, Anyu, Yi Xin, Hang Wu, Lixin Yang, and Banghuai Deng. "A review of sensor applications in electric vehicle thermal management systems." Energies 16, No. 13 (2023): 5139. (Year: 2023).*

* cited by examiner

VEHICLE CONTROL DEVICE

CROSS-REFERENCE TO RELATED APPLICATION(S)

The present application claims priority to and incorporates by reference the entire contents of Japanese Patent Application No. 2021-207077 filed in Japan on Dec. 21, 2021.

BACKGROUND

The present disclosure relates to a vehicle control device.

Japanese laid-open Patent Publication No. 2017-028900 discloses a control device for a power converter in which a switching speed of a switching element of a power converter is set to a lower speed as the atmospheric pressure is lower, and a withstand voltage (motor withstand voltage) of a motor is ensured by surge voltage suppression.

SUMMARY

There is a need for providing a vehicle control device in which a vehicle requirement output can be ensured while a rise in a surge voltage is suppressed.

According to an embodiment, a vehicle control device for a vehicle includes: an engine; and a power converter that converts power of an electrical storage device into a driving power of a rotation electric machine for traveling, so that the vehicle travels by selectively executing one of a first traveling mode in which the vehicle travels only by a torque generated by the engine, a second traveling mode in which the engine is stopped and the vehicle travels only by a torque generated by the rotation electric machine, and a third traveling mode in which the vehicle travels by a torque of both the engine and the rotation electric machine. Further, in a case where an air pressure around the vehicle and a system voltage are in a predetermined area of a preset map indicating a relationship between the air pressure and the system voltage, the vehicle control device is configured to reduce a switching speed of a switching element of the power converter to be lower than a normal speed, and cause the engine to operate, limit a torque of the rotation electric machine, and execute the third traveling mode.

DETAILED DESCRIPTION

In the related art, reducing the switching speed increases the amount of heat generated by the switching element 44. Therefore, it is conceivable to limit the motor torque in order to suppress the amount of heat generated by the switching element 44. However, due to this motor torque limitation, there is a possibility that a vehicle requirement output that is a request value for output necessary for a vehicle to travel cannot be ensured.

An embodiment of a vehicle control device according to the present disclosure will be described below. Note that the present disclosure is not limited by the embodiment.

Figure 1:
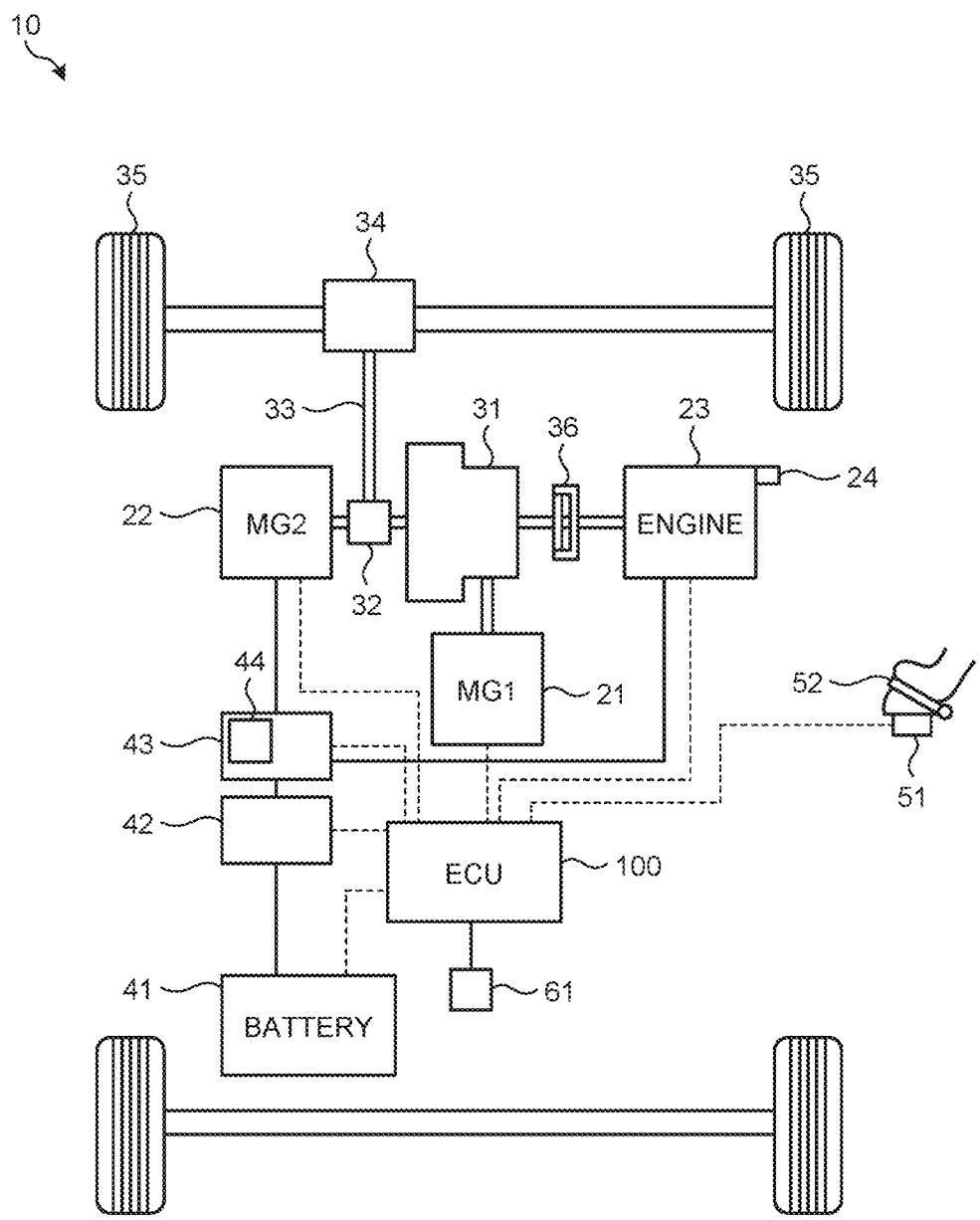
FIG. 1 is a diagram illustrating a schematic configuration of a vehicle to which a vehicle control device according to an embodiment is applied.

FIG. 1 is a diagram illustrating a schematic configuration of a vehicle 10 to which a vehicle control device according to an embodiment is applied. As illustrated in FIG. 1, the vehicle 10 according to the embodiment is a hybrid electric vehicle including a first rotation electric machine (MG1) 21, a second rotation electric machine 22 (MG2), and an engine 23. Note that the vehicle 10 illustrated in FIG. 1 includes two rotation electric machines, however, it is not limited thereto, and, for example, one rotation electric machine capable of outputting driving force for traveling of the vehicle and the engine 23 may be included. In other words, it is only required that the vehicle 10 according to the embodiment can travel only by the driving force (torque) from a rotation electric machine, can travel only by the driving force (torque) from the engine 23, and can travel by the driving force (torque) from both the rotation electric machine and the engine 23.

Each of the first rotation electric machine 21 and the second rotation electric machine 22 includes a stator including a three-phase winding (coil) that generates a rotating magnetic field and a rotor including a permanent magnet that generates torque by magnetic force with the rotating magnetic field. Each of the first rotation electric machine 21 and the second rotation electric machine 22 is a so-called motor-generator that operates as an electric motor and can also operate as a generator.

The first rotation electric machine 21 is mainly used as a generator. The first rotation electric machine 21 further cranks the engine 23 at the time of starting the engine 23. Note that the first rotation electric machine 21 generating the "torque acting on the engine 23" and performing cranking (to rotate a crankshaft of the engine 23) is also referred to as "motoring".

The second rotation electric machine 22 is mainly used as an electric motor and can generate driving force of the vehicle 10 (torque for causing the vehicle 10 to travel).

The engine 23 is, for example, an internal combustion engine such as a gasoline engine or a diesel engine. The engine 23 includes a starter motor 24 for cranking the engine 23. Similarly to the second rotation electric machine 22, the engine 23 can also generate a driving force of the vehicle 10 (torque for causing the vehicle 10 to travel).

The vehicle 10 includes a power dividing mechanism 31. The power dividing mechanism 31 is a planetary gear mechanism. That is, the power dividing mechanism 31 includes a sun gear (not illustrated), a ring gear (not illustrated) disposed concentrically with the sun gear, a plurality of pinion gears (not illustrated) that meshes with the sun gear and meshes with the ring gear, and a pinion carrier (not illustrated) that holds the plurality of pinion gears in a rotatable and revolvable state around the sun gear.

An output shaft of the first rotation electric machine 21 is connected to the sun gear so as to be able to transmit torque. A crankshaft of the engine 23 is connected to the pinion carriers so as to be able to transmit torque. An output shaft of the second rotation electric machine 22 is connected to the ring gear via a deceleration mechanism 32 so as to be able to transmit torque. The output shaft of the second rotation electric machine 22 is further connected to an axle 33 via the deceleration mechanism 32 so as to be able to transmit torque. The axle 33 is connected to drive wheels 35 via a differential gear 34 so as to be able of transmit torque.

A torsional damper 36 is interposed between the engine 23 and the power dividing mechanism 31. The torsional damper 36 rotatably couples each of a shaft on the engine 23 side and a shaft on the power dividing mechanism 31 side via an elastic body and absorbs variations in torque generated by the engine 23.

The vehicle 10 further includes a battery 41, a boost converter 42, and an inverter 43 that is a power converter. The battery 41 is an electrical storage device, and is, for example, a secondary battery capable of charging and discharging, such as a lithium-ion battery or a nickel-hydrogen battery. The DC power output from the battery 41 is subjected to voltage conversion (boosting) by the boost converter 42. The voltage-converted DC power is converted into AC power by switching operation of a switching element 44 in the inverter 43 and is supplied to the first rotation electric machine 21 and the second rotation electric machine 22.

Meanwhile, in a case where at least one of the first rotation electric machine 21 and the second rotation electric machine 22 operates as a generator, the AC power generated thereby is converted into DC power by the switching operation of the switching element 44 in the inverter 43. Furthermore, the converted DC power is subjected to voltage conversion (stepped down) by the boost converter 42 and supplied to the battery 41. As a result, the battery 41 is charged. Alternatively, the AC power generated by the first rotation electric machine 21 is supplied to the second rotation electric machine 22 via the inverter 43.

The vehicle 10 includes an air pressure detecting sensor 61 for detecting the atmospheric pressure. The air pressure detecting sensor 61 outputs a detection signal corresponding to the atmospheric pressure around the vehicle 10 to a control device 100. Note that, in the following description, the atmospheric pressure is also simply referred to as the air pressure. Note that, in the present embodiment, the method of detecting the atmospheric pressure around the vehicle 10 is not limited to detection of the atmospheric pressure by the air pressure detecting sensor 61, and for example, the atmospheric pressure may be estimated from the altitude at the current position of the vehicle 10 using a car navigation system, an altimeter, or the like installed in the vehicle 10.

The control device 100 includes a plurality of electric control units (ECUs) for controlling the vehicle 10. That is, the control device 100 includes an MG-ECU that controls the first rotation electric machine 21 and the second rotation electric machine 22, an engine-ECU that controls the engine 23, a battery-ECU that monitors the battery 41, and the like. The control device 100 selectively executes an engine traveling mode that is a first traveling mode in which the vehicle 10 travels only by torque generated by the engine 23, a motor traveling mode that is a second traveling mode in which the engine 23 is stopped and the vehicle 10 travels only by torque generated by the second rotation electric machine 22, a hybrid traveling mode that is a third traveling mode in which the vehicle 10 travels by torque of both the engine 23 and the second rotation electric machine 22, or the like.

Note that the ECU is an electric control device including a microcomputer as the main part and is connected so as to be able to transmit and receive information to and from via a controller area network (CAN) (not illustrated). The microcomputer includes a central processing unit (CPU), a read only memory (ROM), a random access memory (RAM), a nonvolatile memory, an interface I/F, etc. The CPU implements various functions by executing instructions (programs, routines) stored in the ROM. Some or all of these ECUs may be integrated into one ECU.

An accelerator opening sensor 51 detects an operation amount of an accelerator pedal 52 and outputs a signal indicating the operation amount. The control device 100 controls the first rotation electric machine 21, the second rotation electric machine 22, the engine 23, and others in order to drive the vehicle 10 on the basis of the operation amount of the accelerator pedal 52, the vehicle speed, and the like.

Figure 2:
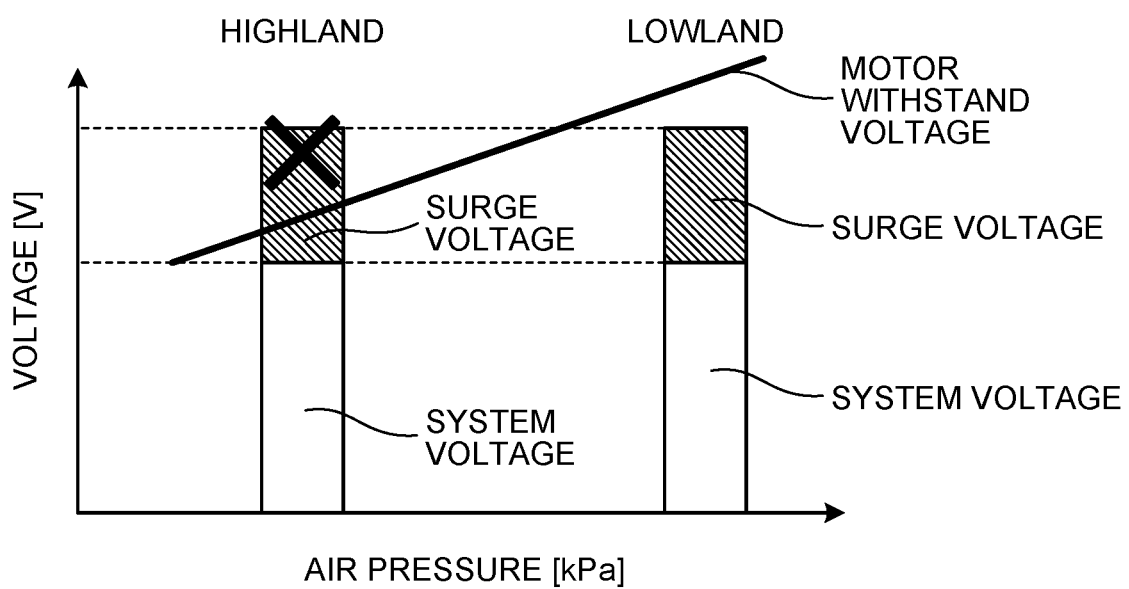
FIG. 2 is a graph illustrating the motor withstand voltage on the lowland and the highland.

FIG. 2 is a graph illustrating the motor withstand voltage on the lowland and the highland. Illustrated in FIG. 2 is the motor withstand voltage that is the withstand voltage of the second rotation electric machine 22 in a case where the system voltage and the surge voltage of the vehicle 10 are the same on the lowland (position with a low altitude) and the highland (position with a high altitude). Note that the system voltage is a voltage of the power supplied to the inverter 43 that drives the second rotation electric machine 22. Note that the system voltage is detected by a voltage sensor (not illustrated). Moreover, the surge voltage is an overshot voltage generated by continuous switching operation in the inverter 43 when power is supplied from the battery 41 to the second rotation electric machine 22 via the inverter 43.

As illustrated in FIG. 2, the motor withstand voltage decreases from lowland to highland, in other words, as the air pressure decreases. Therefore, although the motor withstand voltage is higher than the total voltage of the system voltage and the surge voltage on the lowland, there are cases where the total voltage of the system voltage and the surge voltage exceeds the motor withstand voltage on the highland. Therefore, in the vehicle 10 according to the embodiment, the control device 100 performs control to switch operation modes of the vehicle 10 depending on the air pressure and the system voltage.

Figure 3:
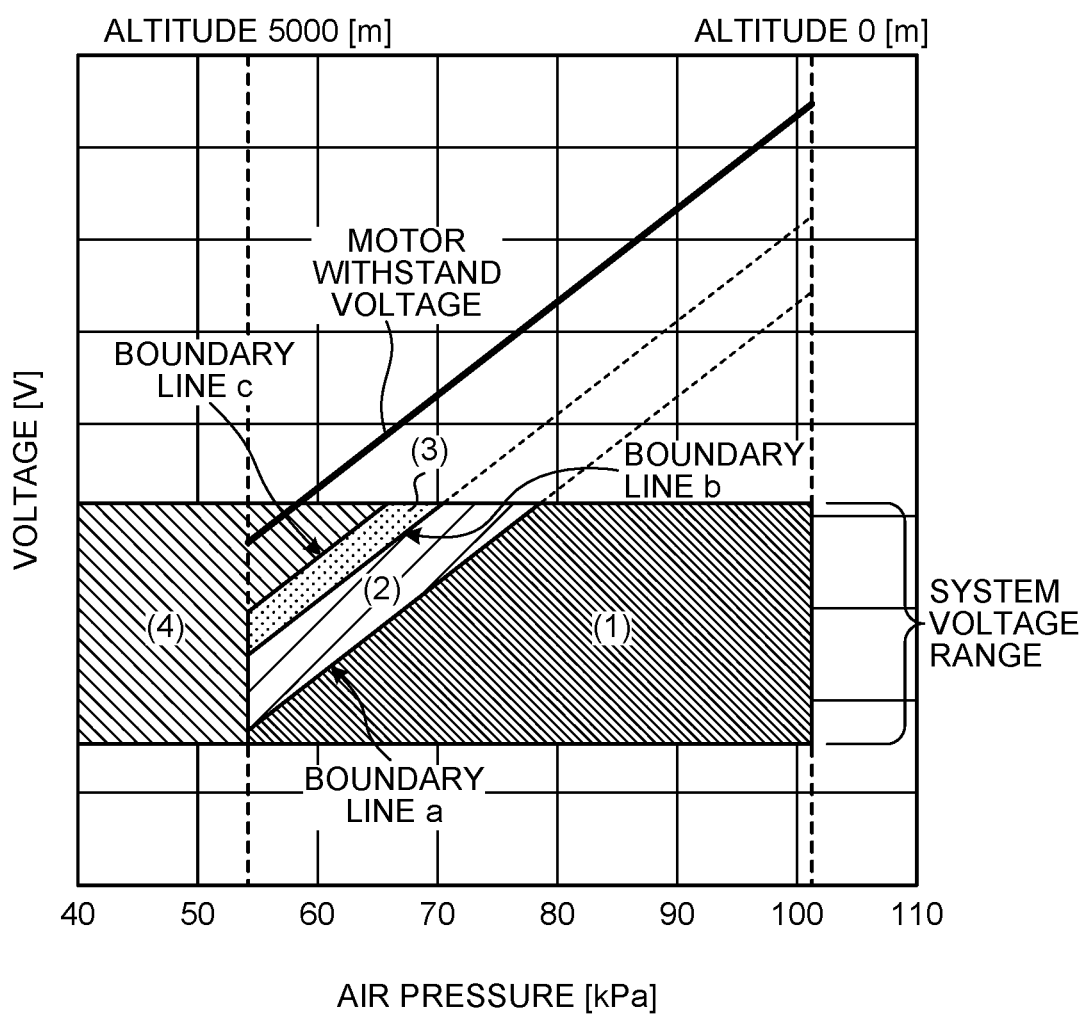
FIG. 3 is a graph illustrating a preset map illustrating a relationship between the air pressure and the system voltage.

FIG. 3 is a graph illustrating a preset map illustrating a relationship between the air pressure and the system voltage. In the vehicle 10 according to the embodiment, as in the preset map indicating the relationship between the air pressure and the system voltage in FIG. 3, operation modes for areas (1) to (4) are set in correspondence with the relationship between the air pressure detected by the air pressure detecting sensor 61 and the system voltage. Furthermore, the control device 100 performs control to cause the vehicle 10 to travel by switching to one of the operation modes for the areas (1) to (4) depending on the air pressure and the system voltage.

Here, the area (1) is an area of an operation mode in which the second rotation electric machine 22 can be used without torque limitation at a switching speed in which the system loss is optimized (normal operation area of the second rotation electric machine 22). The area (2) is an area of an operation mode in which, although the switching loss and the element heat of the inverter 43 are deteriorated, the second rotation electric machine 22 can be used without torque limitation by reducing the switching speed within a range in which the element heat is established (switching speed switching (lowering) area for the inverter 43). Note that the element heat is the heat of the switching element 44 generated by the switching operation in the inverter 43. The area (3) is an area of an operation mode in which the torque of the second rotation electric machine 22 is limited after reducing the switching speed (torque limiting area for the second rotation electric machine 22). The area (4) is an area of an operation mode for completely stopping the switching operation of the inverter 43 (operation prohibited area for the second rotation electric machine 22 (switching stop area for the inverter 43)).

In the vehicle 10 according to the embodiment, for example, when the vehicle 10 is caused to travel on a lowland such as at an altitude of 0 meters, the operation mode is switched to the operation mode of the area (1) for performing a motor travel mode in which the engine 23 is stopped and the vehicle 10 travels only by the torque generated by the second rotation electric machine 22.

Moreover, when the relationship between the air pressure and the system voltage shifts from the area (1) to the area (2) beyond a boundary line a illustrated in FIG. 3 as the vehicle 10 travels, for instance, the control device 100 switches to the operation mode in which the motor travel mode is performed without limiting the torque of the second rotation electric machine 22 while reducing the switching speed of the inverter 43.

As a result, in the operation mode of the area (2), by reducing the switching speed of the inverter 43, thereby suppressing a rise in the surge voltage and ensuring the motor withstand voltage, it is possible to cause the vehicle 10 to travel in the motor travel mode by ensuring the required output of the second rotation electric machine 22.

Furthermore, in a case where the relationship between the air pressure and the system voltage shifts from the area (2) to the area (3) beyond a boundary line b illustrated in FIG. 3 as the vehicle 10 travels, for instance, the control device 100 starts the engine 23 at the boundary line b. Meanwhile, in the operation mode of the area (3), intermittent operation of the engine 23 is prohibited. That is, in the operation mode of the area (3), the torque of the second rotation electric machine 22 is limited on the premise that the engine 23 is operating, and the driving of the second rotation electric machine 22 is permitted.

As a result, in the operation mode of the area (3), it is possible to ensure the vehicle requirement output by causing the vehicle 10 to travel in the hybrid traveling mode by liming the torque of the second rotation electric machine 22 after reducing the switching speed of the inverter 43 and thereby suppressing a rise in the surge voltage and ensuring the motor withstand voltage.

When the relationship between the air pressure and the system voltage shifts from the area (3) to the area (4) beyond a boundary line c as the vehicle 10 travels, for instance, the control device 100 completely stops the switching operation of the inverter 43, stops the driving of the second rotation electric machine 22, and switches to the operation mode for performing the engine traveling mode in which the vehicle 10 travels only by the torque of the engine 23 that is operating. Meanwhile, in the operation mode of the area (4), intermittent operation of the engine 23 is prohibited.

As a result, in the operation mode of the area (4), under the condition that the total voltage of the system voltage and the surge voltage is prone to exceed the motor withstand voltage, it is possible to stop the second rotation electric machine 22, to cause the vehicle 10 to travel in the engine traveling mode, and to ensure the vehicle requirement output.

Note that, for example, in a case where the vehicle 10 is a plug-in hybrid electric vehicle, the engine 23 is started using the starter motor 24 when the relationship between the air pressure and the system voltage is in the area (4) at the time when the vehicle is Ready-ON after the battery 41 has been charged by an external charging device on a highland.

Furthermore, in the vehicle 10 according to the embodiment, intermittent operation of the engine 23 is prohibited when the relationship between the air pressure and the system voltage is in the areas (3) and (4), and, meanwhile, intermittent operation of the engine 23 is permitted when the relationship between the air pressure and the system voltage shifts from the area (3) to the area (2).

As described above, in the vehicle 10 according to the embodiment, the control device 100 switches to one of the operation modes of the area (1) to the area (4) depending on the air pressure and the system voltage to cause the vehicle 10 to travel, and thus it is possible to ensure the vehicle requirement output while suppressing a rise in the surge voltage and ensuring the motor withstand voltage.

A vehicle control device according to the present disclosure achieves an effect that vehicle requirement output can be ensured while a rise in a surge voltage is suppressed.

According to an embodiment, it is possible to ensure the vehicle requirement output while a rise in a surge voltage is suppressed.

According to an embodiment, even when the torque of the rotation electric machine is limited, the vehicle requirement output can be more reliably ensured by the torque of the engine by causing the engine to continuously operate.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device for a vehicle, comprising:
   an engine; and
   a power converter that converts power of an electrical storage device into a driving power of a rotation electric machine for traveling, so that the vehicle travels by selectively executing one of a first traveling mode in which the vehicle travels only by a torque generated by the engine, a second traveling mode in which the engine is stopped and the vehicle travels only by a torque generated by the rotation electric machine, and a third traveling mode in which the vehicle travels by a torque of both the engine and the rotation electric machine,
   wherein, an air pressure around the vehicle and a system voltage are in a predetermined area of a preset map, the predetermined area corresponding with an operation mode, the preset map indicating a relationship between the air pressure and the system voltage; and
   wherein, in response to determining the air pressure around the vehicle and the system voltage are in the predetermined area, the vehicle control device is configured to execute the operation mode to reduce a switching speed of a switching element of the power converter to be lower than a normal speed, and cause the engine to operate, limit a torque of the rotation electric machine, and execute the third traveling mode.

2. The vehicle control device according to claim 1, wherein an intermittent operation of the engine is prohibited in the predetermined area.

3. The vehicle control device according to claim 1, wherein the preset map may include a plurality of predetermined areas.

4. The vehicle control device according to claim 3, wherein the plurality of predetermined areas may correspond with a plurality of operation modes.

\* \* \* \* \*